US012113845B2

(12) United States Patent
Abhishek et al.

(10) Patent No.: US 12,113,845 B2
(45) Date of Patent: Oct. 8, 2024

(54) TECHNIQUES FOR SIGNALING AUDIO MIXING GAIN IN TELECONFERENCING AND TELEPRESENCE FOR REMOTE TERMINALS

(71) Applicant: TENCENT AMERICA LLC, Palo Alto, CA (US)

(72) Inventors: Rohit Abhishek, San Jose, CA (US); Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 53 days.

(21) Appl. No.: 17/692,840

(22) Filed: Mar. 11, 2022

(65) Prior Publication Data

US 2022/0294839 A1   Sep. 15, 2022

Related U.S. Application Data

(60) Provisional application No. 63/160,630, filed on Mar. 12, 2021.

(51) Int. Cl.
*H04L 65/65* (2022.01)
*H04L 65/70* (2022.01)
*H04M 3/56* (2006.01)

(52) U.S. Cl.
CPC .............. *H04L 65/70* (2022.05); *H04L 65/65* (2022.05); *H04M 3/568* (2013.01)

(58) Field of Classification Search
CPC ....... H04L 65/70; H04L 65/65; H04L 65/607; H04L 65/608; H04M 3/568
See application file for complete search history.

(56) References Cited

U.S. PATENT DOCUMENTS

| 2016/0323063 A1 | 11/2016 | Mandyam et al. |
| 2018/0027027 A1 | 1/2018 | Leung et al. |
| 2019/0335287 A1 | 10/2019 | Jung et al. |

FOREIGN PATENT DOCUMENTS

EP   3016344 A1   5/2016

OTHER PUBLICATIONS

International Search Report dated Nov. 3, 2022 issued by the International Searching Authority in Application No. PCT/US22/20150.

(Continued)

*Primary Examiner* — Rasha S Al Aubaidi
(74) *Attorney, Agent, or Firm* — Sughrue Mion, PLLC

(57) ABSTRACT

A method and system for audio mixing in a teleconference using a Session Description Protocol (SDP) and Real-time Transport Protocol (RTP) signaling of audio mixing gain is provided. The method includes receiving an input audio stream from a 360-degree video/audio stream that includes an audio mixing gain which includes audio gain from the input audio stream and audio gain from overlay audio streams, declaring a RTP header extension for the input audio stream using the SDP, the RTP header extension, and signaling the audio mixing gain based on a single attribute of the SDP using the RTP header extension. An element of the RTP header extension may include an element identifier, a length of an extension element, and a magnitude of the audio mixing gain of the RTP header extension. The RTP header extension may use a one-byte or two-byte header extension format which is declared using the SDP.

20 Claims, 9 Drawing Sheets

(56) References Cited

OTHER PUBLICATIONS

Written Opinion dated Nov. 3, 2022 issued by the International Searching Authority in Application No. PCT/US22/20150.
D. Singer et al., "A General Mechanism for RTP Header Extensions", Internet Engineering Task Force (IETF), Oct. 2017, pp. 1-25 (25 pages total).
ISO/IEC JTC 1/SC 29/WG3 N00072 WG3 MPEG Systems, Information technology—Coded represenation of immerse media—Part 2: Omnidirectional MediA Format (OMAF) 2nd Edition, Dec. 2020 (329 pages total).
E. Ivov et al., "A Real-time Transport Protocol (RTP) Header Extension for Mixer-to-Client Audio Level Indication", Internet Engineering Task Force (IETF), Dec. 2011, pp. 1-15 (15 pages total).
Intel, Nokia Corporation (ITT4RT Co-Rapporteurs), "ITT4RT Permanent Document-Requirements, Working Assumptions and Potential Solutions", 3GPP TSG-SA4 Meeting #109e, S4-200840, Online Meeting, May 20-Jun. 3, 2020 (44 pages total).
Communication dated Nov. 9, 2023 from European Patent Office in Application No. 22768157.4.
Nikolai Leung et al: "MTSI SWG Report during SA4#112-e", 3GPP Draft; S4-210175, 3rd Generation Partnership Project (3GPP), Mobile Competence Centre ; 650, Route Des Lucioles ; F-06921 Sophia-Antipolis Cedex ; France vol. SA WG4, No. e meeting; Feb. 1, 2020-Feb. 10, 2020 Feb. 10, 2021 (Feb. 10, 2021), XP052173086, Retrieved from the Internet:URL:https://ftp.3gpp.org/tsg_sa/WG4_CODEC/TSGS4_112-e/Docs/S4-210175.zip S4-210175 MTSI SWG Report during SA4#112-e.docx [retrieved on Feb. 10, 2021].
Tencent: "Signaling for Audio mixing gain", 3GPP Draft:S4-210534, 3rd Generation Partnership Project (3GPP), Mobile Competence Centre ; 650, Route Des Lucioles ; F-06921 Sophia-Antipolis Cedex ; France vol. SA WG4, No. Apr. 6, 2021-Apr. 14, 2021 Mar. 31, 2021 (Mar. 31, 2021), XP051991795, Retrieved from the Internet: URL:https://ftp.3gpp.org/tsg_sa/WG4_CODEC/TSGS4_113-e/Docs/S4-210534.zip S4-210534.docx [retrieved on Mar. 31, 2021] * p. 2, paragraph 2.2—p. 3, paragraph 2.2.2*.
Nokia Corporation (ITT4RT RAPPORTEUR): "ITT4RT Permanent Document—Requirements, Working Assumptions and Potential Solutions", 3GPP Draft; S4-210933, 3rd Generation Partnership Project (3GPP), Mobile Competence Centre ; 650, Route Des Lucioles ; F-06921 Sophia-Antipolis Cedex ; France vol. SA WG4, No. Online Meeting; May 19, 2021-May 28, 2021 May 26, 2021 (May 26, 2021), XP052015203, Retrieved from the Internet: URL:http://ftp.3gpp.org/tsg_sa/WG4_CODEC/TSGS4_114-e/Inbox/S4-210933.zip S4-210933_ITT4RT_Permanent _Document v. 0.12.0.doc [retrieved on May 26, 2021] * p. 11, paragraph 3.9—p. 14, paragraph 3.9.3* ***Especially the paragraph of p. 13, section 3.9.2, titled RTP based solutions****.
Extended European Search Report dated Oct. 23, 2023 from the European Patent Office in European Application No. 22768157.4.

TECHNIQUES FOR SIGNALING AUDIO MIXING GAIN IN TELECONFERENCING AND TELEPRESENCE FOR REMOTE TERMINALS

CROSS-REFERENCE TO RELATED APPLICATION

This application is based on and claims priority to U.S. Provisional Patent Application No. 63/160,630, filed on Mar. 12, 2021, the disclosure of which is incorporated by reference herein in its entirety.

FIELD

Embodiments of the present disclosure relate to signaling of audio mixing gain for Immersive Teleconferencing and Telepresence for Remote Terminals (ITT4RT), and more specifically related to defining a Session Description Protocol (SDP) attribute and a Real-time Transport Protocol (RTP) header extension for signaling the audio mixing gain for mixing the audio streams of a 360-degree background and overlay together based on different use-cases.

BACKGROUND

When an omnidirectional media stream is used, only part of the content corresponding to the user's viewport is rendered, while using a head-mounted display (HMD), giving the user a realistic view of the media stream.

FIG. 1 illustrates a related art scenario (scenario 1) for an immersive teleconference call, where the call is organized among Room A (101), User B (102), and User C (103). As shown in FIG. 1, Room A (101) represents a conference room with an omnidirectional/360-degree camera (104), and User B (102) and User C (103) are remote participants using an HMD and mobile devices, respectively. In this case, participants User B (102) and User C (103) send their viewport orientation to Room A (101), which in turn sends User B (102) and User C (103) the viewport dependent stream.

An extended scenario (scenario 2) is shown in FIG. 2A which includes multiple conference rooms (2a01, 2a02, 2a03, 2a04). User B (2a06) uses an HMD to view a video stream from the 360-degree camera (104), and User C (2a07) uses a mobile device to view the video stream. User B (2a06) and User C (2a07) send their viewport orientation to at least one of the conference rooms (2a01, 2a02, 2a03, 2a04), which in turn sends User B (2a06) and User C (2a07) the viewport dependent stream.

As shown in FIG. 2B, another example scenario (scenario 3) is when the call is set up using an MRF/MCU (2b05) where the Media Resource Function (MRF) and the Media Control Unit (MCU) are multimedia servers that provide media-related functions for bridging terminals in a multi-party conference call. The conference rooms may send their respective videos to the MRF/MCU (2b05). These videos are viewport independent videos, i.e., the entire 360-degree video is sent to the media-server (i.e., the MRF/MCU) irrespective of the user's viewport streaming the particular video. The media server receives the viewport orientation of the users (User B (2b06) and User C (2b07)) and accordingly sends the users the viewport-dependent streams.

Further to scenario 3, the remote users can choose to view one of the available 360-degree videos from the conference rooms (2a01-2a04, 2b01-2b04). In such a case, the user sends the information about the video it would like to stream and its viewport orientation to the conference room or the MRF/MCU (2b05). The user can also trigger switching from one room to another based on the active speaker. The media-server may pause receiving a video stream from any conference room that does not have active users.

ISO 23090-2 defines overlay as a "piece of visual media rendered over omnidirectional video or image item or over a viewport." When any presentation is being shared by any participant in conference room A, besides being displayed in conference room A, this presentation is also broadcasted as a stream to other users (conference rooms 2a02-2a04, 2b02-2b04, User B (2b06), and/or User C (2b07)). This stream can be overlaid on top of the 360-degree video. Additionally, overlays can also be used for 2D streams. A default audio mixing gain for the different audio streams are the audio gains ($r_0, r_1, \ldots, r_N$) for the 360 video (a0) and overlay videos ($a_1, a_2, \ldots, a_N$), respectively, and the audio output equals $r_0*a_0 + r_1*a_1 + \ldots + r_n*a_n$, where $r_0 + r_1 + \ldots + r_N = 1$. The receiver or MRF/MCU mixes the audio sources proportionally to their mixing gain.

SUMMARY

One or more example embodiments of the present disclosure provide a system and a method for signaling audio mixing gain for mixing audio streams from overlays and a 360-degree stream using a Real-time Transport Protocol (RTP) header extension.

According to embodiments, there is provided a method for signaling audio mixing gain in a teleconference using SDP. The method may include receiving an input audio stream, from a 360-degree stream, including an audio mixing gain, declaring a RTP header extension for the input audio stream using the SDP, the RTP header extension comprising an element identifier, a length of the element, and a magnitude of the audio mixing gain, and signaling the audio mixing gain based on a single attribute of the SDP using the RTP header extension, wherein the audio mixing gain includes a first audio gain from the input audio stream and a second audio gain from overlay audio streams.

According to embodiments, there is provided a system for signaling audio mixing gain in a teleconference using SDP. The system may include at least one memory storing instructions and at least one processor configured to execute the instructions to receive an input audio stream, from a 360-degree stream, the input audio stream including an audio mixing gain, declare a RTP header extension for the input audio stream using the SDP, the RTP header extension comprising an element identifier, a length of the element, and a magnitude of the audio mixing gain, and signal the audio mixing gain based on a single attribute of the SDP using the RTP header extension, wherein the audio mixing gain includes a first audio gain from the input audio stream and a second audio gain from overlay audio streams.

According to embodiments, there is provided a non-transitory computer readable medium for signaling audio mixing gain in a teleconference using SDP. The non-transitory computer readable medium may be connected to at least one processor and may be configured to store instructions that, when executed, cause the at least one processor to receive an input audio stream, from a 360-degree stream, the input audio stream including an audio mixing gain, declare a RTP header extension for the input audio stream using the SDP, the RTP header extension comprising an element identifier, a length of the element, and a magnitude of the audio mixing gain, and signal the audio mixing gain based on a single attribute of the SDP using the RTP header extension, wherein the audio mixing gain includes a first audio gain from the input audio stream and a second audio gain from overlay audio streams.

Additional aspects will be set forth in part in the description that follows and, in part, will be apparent from the description, or may be realized by practice of the presented embodiments of the disclosure.

BRIEF DESCRIPTION OF THE DRAWINGS

The above and other aspects, features, and aspects of embodiments of the disclosure will be more apparent from the following description taken in conjunction with the following accompanying drawings.

DETAILED DESCRIPTION

The present disclosure relates to a method and apparatus for SDP signaling of audio gain from overlay and a 360-degree stream in a teleconference. The present disclosure further relates to signaling of the audio mixing gain for the overlay and the 360-degree stream in the teleconference for audio mixing via a RTP header extension.

Figure 1:
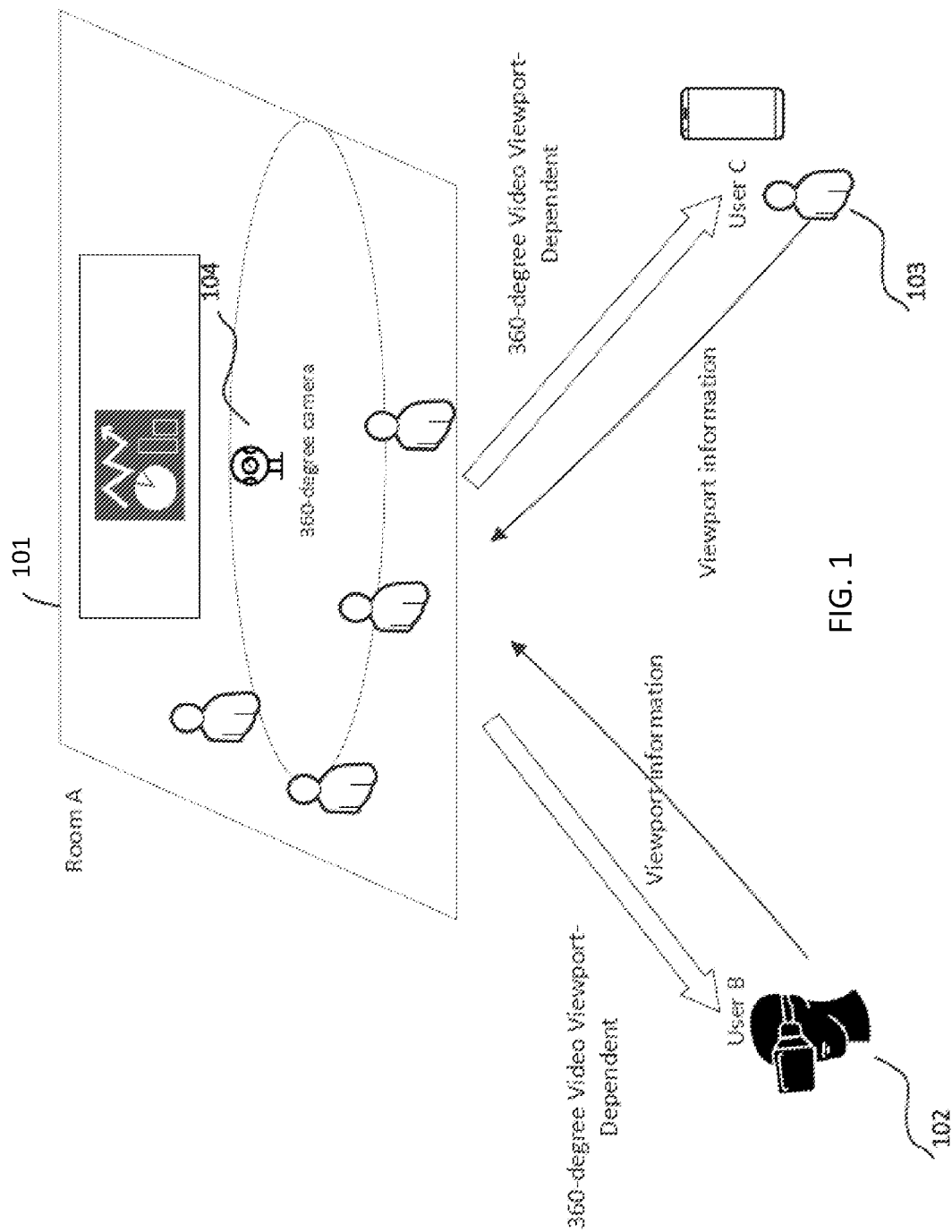
FIG. 1 is a schematic illustration of the ecosystem for immersive teleconferencing.
Figure 2A:
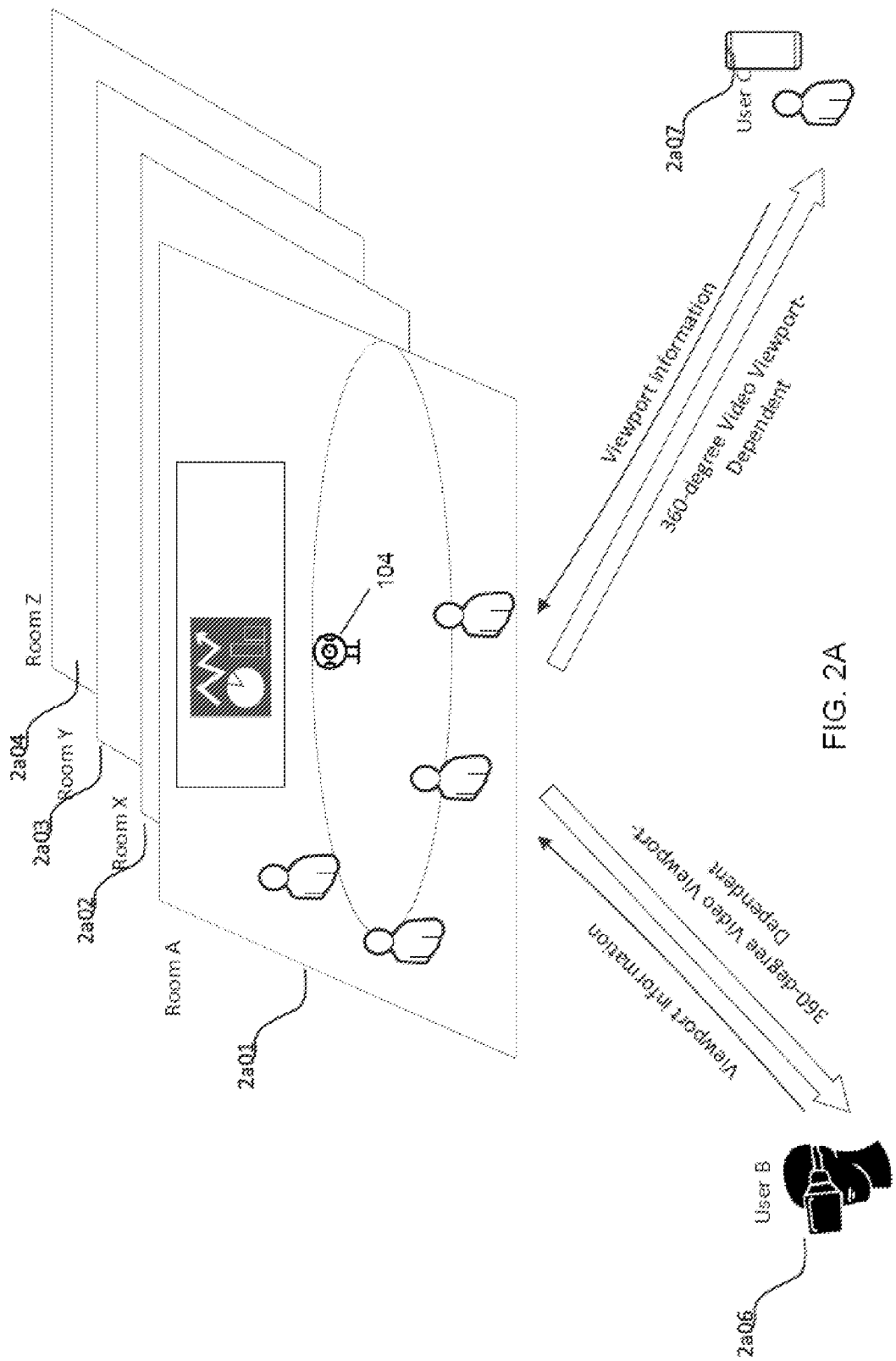
FIG. 2A is a schematic illustration of multiparty multi-conference room teleconferencing.
Figure 2B:
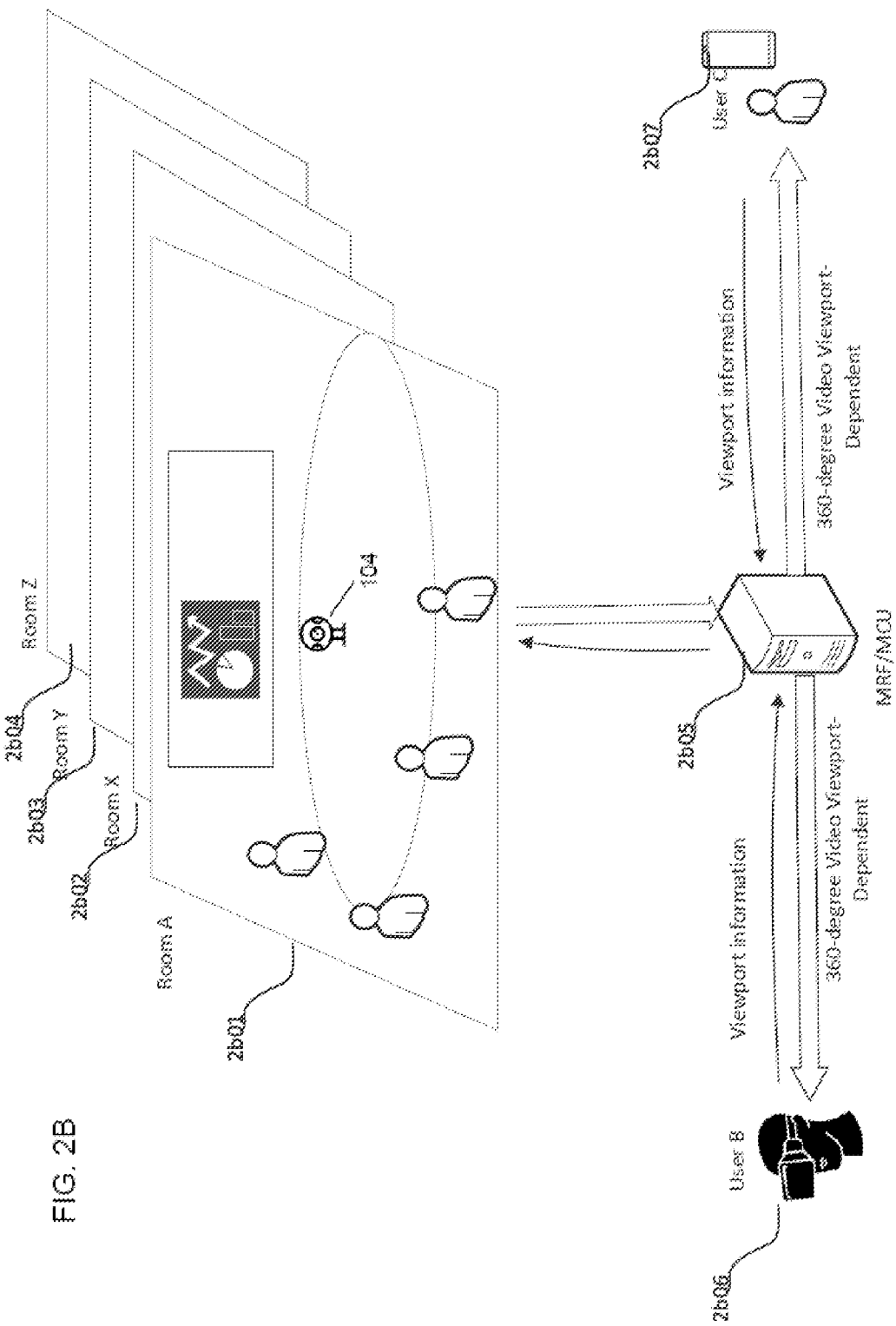
FIG. 2B is a schematic illustration of multiparty multi-conference room teleconferencing using MRF/MCU.

As shown in FIG. 2A and FIG. 2B, multiple conference rooms with an omnidirectional camera are in a teleconference and a user chooses a video/audio stream from one of the conference rooms ($2a01$, $2a02$, $2a03$, $2a04$) to be displayed as immersive stream. Any additional audio or video stream used with the 360-degree immersive stream is sent as an overlay (i.e., as a separate stream). The end device upon receiving multiple audio streams, decodes and mixes them to be rendered to the user. The sender conference room provides the mixing gain levels of all the different audio streams. The sender conference room may also update the mixing gain levels of the different audio streams during the teleconference session. The audio mixing gain may be defined for each audio stream. Thus, it would be desirable to use a method of sending/receiving all audio gains ($r_0$, $r_1$, ..., $r_N$) and the overlay videos ($a_1$, $a_2$, ..., $a_N$) using a single header extension as detailed in embodiments of the present disclosure.

Embodiments of the present disclosure are described comprehensively with reference to the accompanying drawings. However, the examples of implementations may be implemented in various multiple forms, and the disclosure should not be construed as being limited to the examples described herein. Conversely, the examples of implementations are provided to make the technical solution of the disclosure more comprehensive and complete, and comprehensively convey the idea of the examples of the implementations to a person skilled in the art. The accompanying drawings are merely example illustrations of the disclosure and are not necessarily drawn to scale. A same reference numeral in the accompanying drawings represents same or similar components, and therefore repeated descriptions of the components are omitted.

The proposed features discussed below may be used separately or combined in any order. Some block diagrams shown in the accompany drawings are functional entities and do not necessarily correspond to physically or logically independent entities. Further, the embodiments may be implemented by processing circuitry (e.g., one or more processors or one or more integrated circuits) or implemented in the form of software, or implemented in different networks and/or processor apparatuses and/or microcontroller apparatuses. In one example, the one or more processors execute a program that is stored in a non-transitory computer-readable medium.

Figure 3:
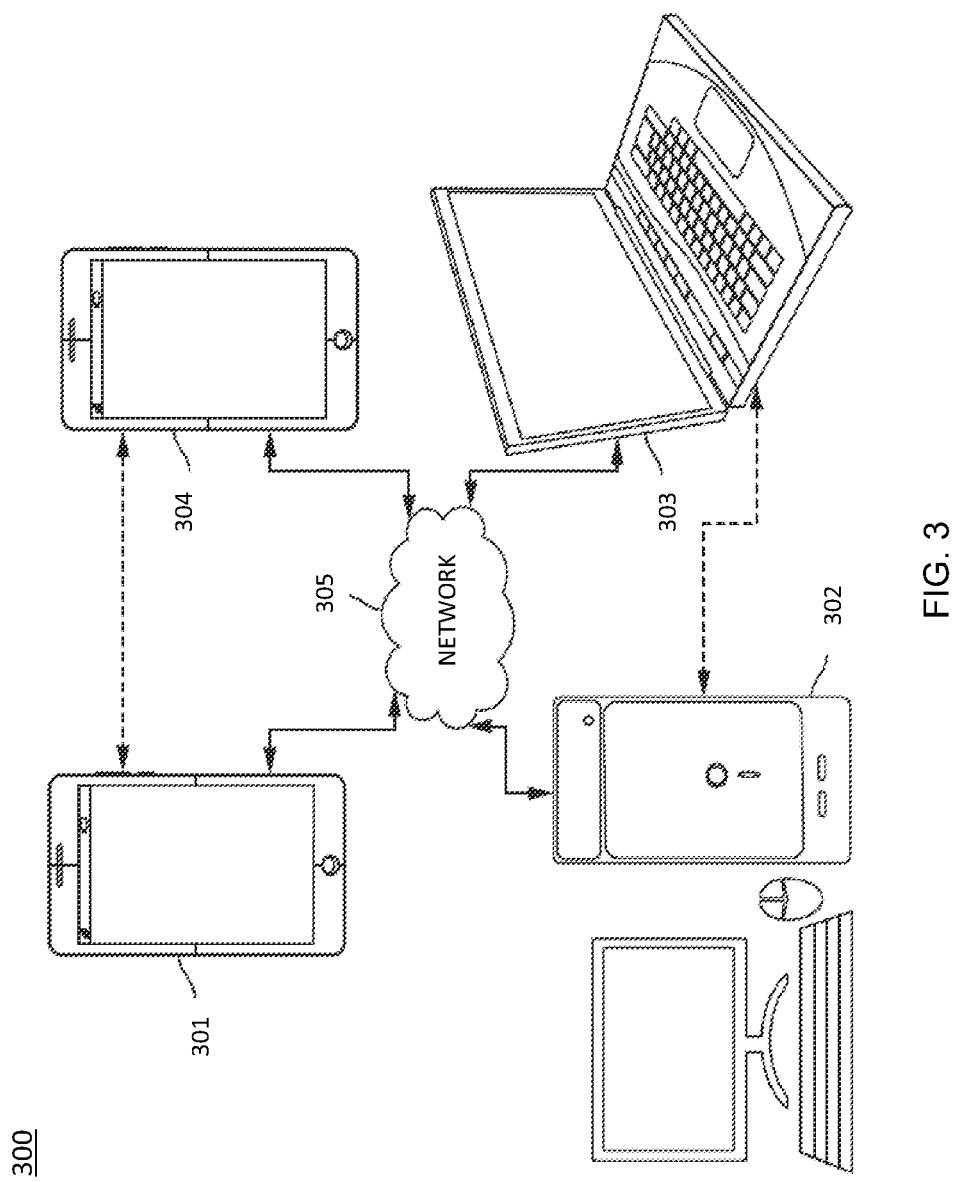
FIG. 3 is a simplified block diagram of a communication system, according to one or more embodiments.

FIG. 3 is a simplified block diagram of a communication system (300) according to embodiments of the present disclosure. The communication system (300) may include at least two terminals (302, 303) interconnected via a network (305). For unidirectional transmission of data, a first terminal (303) may code video data at a local location for transmission to the other terminal (302) via the network (305). The second terminal (302) may receive the coded video data of the other terminal from the network (305), decode the coded data and display the recovered video data. Unidirectional data transmission may be common in media serving applications such as teleconferencing and the like.

FIG. 3 illustrates a second pair of terminals (301, 304) provided to support bidirectional transmission of coded video that may occur, for example, during videoconferencing. For bidirectional transmission of data, each terminal (301, 304) may code video data captured at a local location for transmission to the other terminal via the network (305). Each terminal (301, 304) also may receive the coded video data transmitted by the other terminal, may decode and mix the coded data and may display the recovered video data at a local display device.

In FIG. 3, the terminals (301, 302, 303, 304) may be illustrated as servers, personal computers, and mobile devices but the principles of the present disclosure are not limited to this. Embodiments of the present disclosure find application with laptop computers, tablet computers, HMDs, other media players, and/or dedicated video conferencing equipment. The network (305) represents any number of networks that convey coded video data among the terminals (301, 302, 303, 304), including for example wireline and/or wireless communication networks. The communication network (305) may exchange data in circuit-switched and/or packet-switched channels. Representative networks include telecommunications networks, local area networks, wide area networks and/or the Internet. Mixing gains discussed in embodiments of the present disclosure may be sent and received using network protocols explained herein below via the network (305) or the like.

Figure 4:
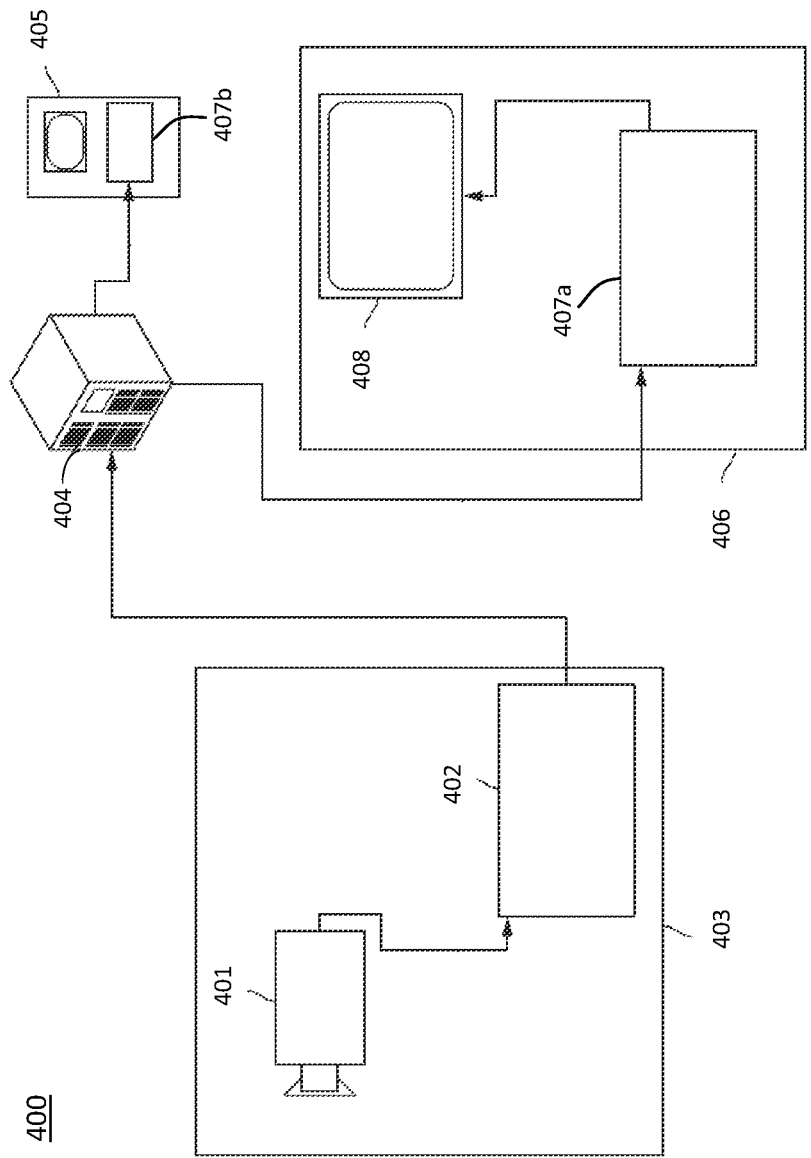
FIG. 4 is a simplified example illustration of a streaming environment, according to one or more embodiments.

FIG. 4 illustrates an example streaming environment for an application for the disclosed subject matter. The disclosed subject matter can be equally applicable to other video enabled applications, including, for example, immersive teleconferencing call, video teleconferencing and telepresence, and so on.

A streaming environment may include one or more conference rooms (403), that may include a video source (401), for example a video camera and one or more participants of the conference (402). The video source (401) illustrated in FIG. 4 is a 360-degree video camera that may, for example, create a video sample stream. The video sample stream may be sent to and/or stored on a streaming server (404) for future use. One or more streaming clients (405, 406) may also send their respective viewport information to the streaming server (404). Based on the viewport information, the streaming server (404) may send a viewport dependent stream to the corresponding streaming clients (405, 406). In another example embodiment, the streaming clients (405, 406) may access the streaming server (404) to retrieve the viewport dependent stream. The streaming server (404) and/or streaming clients (405, 406) may include hardware, software, or a combination thereof to enable or implement aspects of the disclosed subject matter as described in more detail below.

In an immersive teleconferencing call, multiple audio streams may be transmitted from the sender (e.g., 403) to the streaming client (e.g., 405 and/or 406). These streams may include audio streams for the 360-degree video as well as one or multiple audio streams for the overlays. The streaming clients (405, 406) may include mixing components (407*a*, 407*b*). The mixing components may decode and mix the viewport dependent stream of the 360-degree video and overlays, and create an outgoing video sample stream that can be rendered on a display 408 or other rendering device such as an HDM, speaker, mobile device, and so on. Embodiments are not limited to this configuration, the one or more conference rooms (403) may communicate with the streaming clients (405, 406) via a network (e.g., network 305).

The sender may, in an SDP offer, indicate the mixing gain of the 360-degree audio and the overlay audio by including the following media-level attribute:

3 gpp_audio_mix_gain

The following Augmented Backus-Naur Form (ABNF) may be used to describe the audio mixing gain:

a=3 gpp_audio_mix_gain:<audio-mixing-gain>

While using the SDP based solution, the audio mixing gain updates may not be frequent to avoid the network blockage. Additionally, in the SDP offer, the sender may signal the array of mixing gain of the 360-degree video stream and all the overlays in its media attribute by using the following ABNF:

a=3 gpp_audio_mix_gain:3gpp_360audio:<360_mixing_gain>
<overlay_id>:<overlay_mixing_gain>

In the preceding ABNF, the 3gpp_360audio is the identifier for the 360-degree audio stream, the <360_mixing_gain> represents the mixing gain value of the 360audio, the <overlay_id> represents the unique overlay ID used as an identifier for the overlays, and the <overlay_mixing_gain> represents the audio mixing gain of the overlays. The identifiers are used to map the audio mixing value to the audio streams in the media line. According to one or more embodiments, multiple overlays with unique overlay IDs may be present in the same SDP attribute.

If the sender sends an SDP offer with attribute "3gpp_audio_mix_gain", the receiver may or may not accept the offer. If the receiver accepts the offer, the receiver must mix the audio of the 360-degree audio stream and the overlays using the mixing gain recommended by the sender. The receiver may change the value of the mixing gain during the session.

If the receiver chooses to use the recommended mixing gain, the sender may send updates of the audio mix gain during the session when the mixing gain value changes. When this happens, the sender may only the send the media attribute "a=3gpp_audio_mix_gain:" with updated values of the mixing gain mapped to the 360audio and the overlay IDs identifiers, without having the need to send the entire media line. These identifiers may be used to map the updated audio mixing value to the respective audio streams.

Table 1 is an example of a SDP offer being sent from the sender to the receiver (e.g., streaming clients (412, 407)). In the below example, a 3gpp audio, and two overlay audios are mixed together.

TABLE 1 a=itt4rt_group: 1 2 3
a=3gpp_audio_mix_gain: 3gpp_360audio:7 12:5 13:4
m=audio 30000 RTP/AVP 0
a=3gpp_360audio:< audio configuration>
a=mid:1
m=audio 30002 RTP/AVP 31
a=3gpp_overlay: 12
a=mid:2
m=audio 30004 RTP/AVP 0
a=3gpp_overlay: 13
a=mid:3

The line "a=3gpp_audio_mix_gain: 3gpp_360audio:7 12:5 13:4" represents the mixing gain of the 360 audio and the overlays. The "3gpp_360audio" is the identifier for the audio of the 360-degree audio stream having a mixing gain value of 7, "12" is the overlay ID and acts as the identifier for the overlay with a value of mixing gain of "5", and "13" is the identifier for the second overlay with mixing gain value of "4."

When the sender needs to update the mixing gain of the 360-degree audio or the overlay, the sender may send the media attribute defining the "3gpp_audio_mix_gain". Below is an example of a SDP update for updating the audio mixing gain where the 360-degree audio stream having a mixing gain value of 4 is updated.

a=3 gpp_audio_mix_gain: 3 gpp_360audio:4 12:9 13:4

According to the above SDP, the mixing gain value of the overlay having the identifier "12" is updated from the value "5" to a value of "9." The mixing gain value of the second overlay having the identifier "13" is not updated.

Figure 5A:
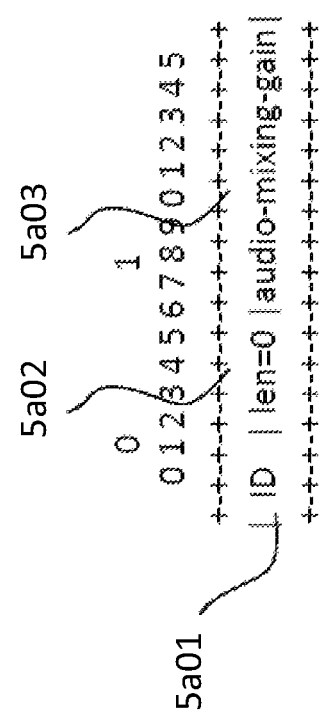
FIG. 5A is a schematic for audio mixing gain using a one-byte RTP header extension, according to one or more embodiments.

Signaling the audio mixing gain from the server to the client will now be described with reference to FIGS. 5A and 5B, according to embodiments.

A RTP-based solution may be used for signaling the audio mixing gain from the server to the client. A packet of a RTP audio stream, in a RTP header extension, may indicate the mixing gain of the audio sample to be carried in the RTP packet with a RTP extension. As shown in FIG. 5A, a one-byte header format may be used for the RTP extension. Elements of the header extension of the RTP extension with the one-byte header format may contain an ID (5*a*01), length L (5*a*02), and mixing gain (5*a*03).

The ID (5*a*01) is a 4-bit ID which is the local identifier of the element. The length L (5*a*02) is a 4-bit length number, minus one, of data bytes of the header extension element and follows the one-byte header. The mixing gain (5*a*03) represents the magnitude of the mixing gain for a single byte of the header extension.

Figure 5B:
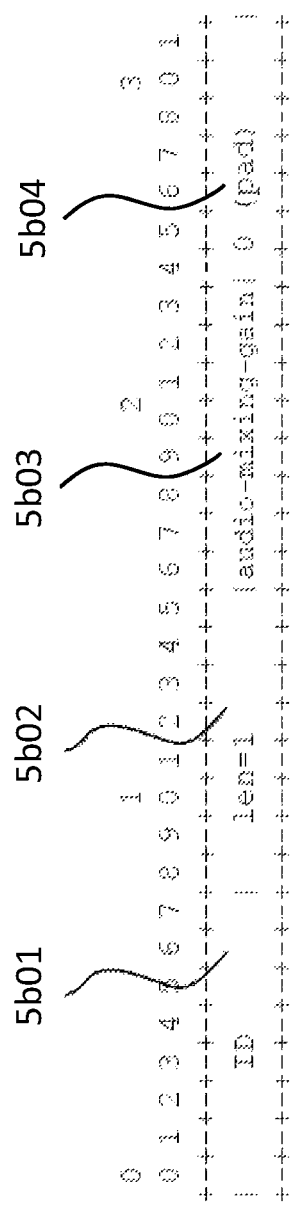
FIG. 5B is a schematic for audio mixing gain using a two-byte RTP header extension, according to one or more embodiments.

As shown in FIG. 5B, a two-byte header format may also be used for the RTP extension. Elements of the header extension of the RTP extension with the two-byte header format may contain an ID (5*b*01), length L (5*b*02), and mixing gain (5*b*03). The two-byte header format may also include padding (5*b*04) bytes with, for example, a value of zero (0).

The ID (5*b*01) is an 8-bit ID which is the local identifier of the element. The length L (5*b*02) is an 8-bit length field which is the length of extension data in bytes, not including the ID and length fields. The mixing gain (5*b*03) represents the magnitude of the mixing gain.

The declaring and mapping of the audio mixing gain header extension is performed in a Session Description Protocol (SDP) extmap attribute. The Uniform Resource Identifier (URI) for declaring the audio mixing gain header extension in the SDP extmap attribute and mapping the audio mixing gain header extension to a local extension header identifier is:

urn:3gpp:rtp-hdrext:audio-mixing-gain

The URI identifies and describes the header extension. In some example embodiments, the header extension may be present only in the first packet of the RTP audio stream and may be repeated when the mixing gain needs to be updated for optimality.

Figure 6:
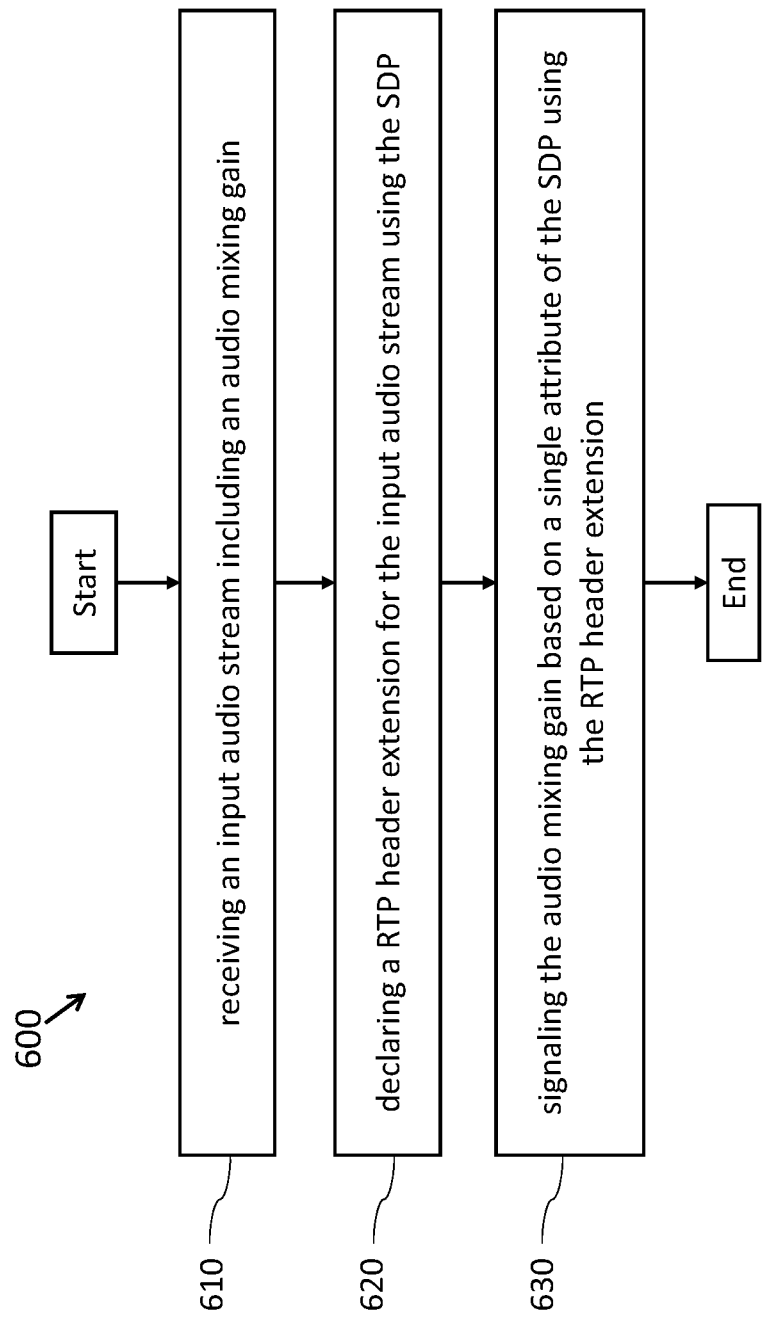
FIG. 6 is a flowchart of a method for SDP signaling of audio mixing gain in a teleconference using a RTP header extension, according to one or more embodiments.

FIG. 6 is a flowchart of a method 600 for signaling audio mixing gain in a teleconference using a RTP header extension, according to an embodiment.

As shown in FIG. 6, in operation 610, the method 600 may include receiving an input audio stream including an audio mixing gain. The input audio stream may be from a 360-degree video/audio stream in a teleconference.

In operation 620, the method 600 may include declaring a RTP header extension for the input audio stream using the SDP. The RTP header extension includes elements wherein each element includes an element identifier, a length of the element, and a magnitude of the audio mixing gain. The RTP header extension may only be present in a first packet of the input audio stream or each packet of the input audio stream.

In operation 630, the method 600 may include signaling the audio mixing gain based on a single attribute of the SDP using the RTP header extension. The audio mixing gain may include audio gain from the input audio stream and audio gain from overlay audio streams. An Augmented Backus-Naur Form (ABNF) for the SDP may be used to describe the audio mixing gain and the single attribute. The RTP header extension may use a one-byte or two-byte RTP header extension format for signaling the audio mixing gain. Additionally, the audio mixing gain may be updated. When the audio signal is updated, only a media level portion of the single attribute specifying the audio mixing gain is signaled and the RTP header extension is repeated. The method 600 may further include signaling an array of audio mixing gains from the input audio stream and from the overlay audio streams.

Although FIG. 6 shows example blocks of the method, in some implementations, the method may include additional blocks, fewer blocks, different blocks, or differently arranged blocks than those depicted in FIG. 6. Additionally, or alternatively, two or more of the blocks of the method may performed in parallel.

The techniques for signaling audio mixing gain for teleconferencing and telepresence described above may be implemented as computer software using computer-readable instructions and physically stored in one or more computer-readable media. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
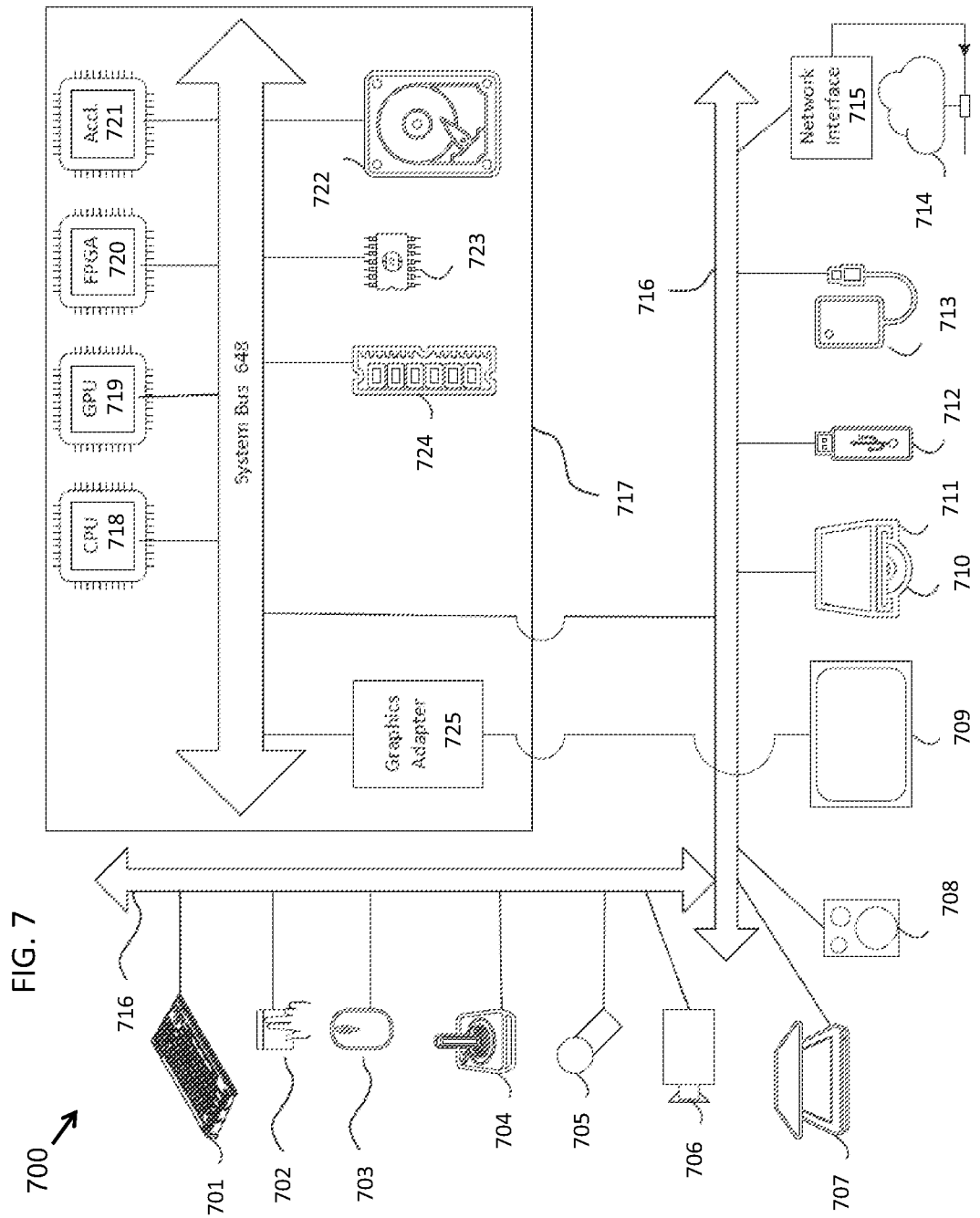
FIG. 7 is a schematic illustration of a computer system, according to one or more embodiments.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as keystrokes, swipes, data glove movements), audio input (such as voice, clapping), visual input (such as gestures), olfactory input. The human interface devices can also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard 701, trackpad 702, mouse 703, touch-screen 709, data-glove, joystick 704, microphone 705, camera 706, scanner 707.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 709, data-glove, or joystick 704, but there can also be tactile feedback devices that do not serve as input devices), audio output devices (such as: speakers 708, headphones), visual output devices (such as screens 709 to include CRT screens, LCD screens, plasma screens, OLED screens, each with or without touch-screen input capability, each with or without tactile feedback capability—some of which may be capable to output two-dimensional visual output or more than three-dimensional output through means such as stereographic output; virtual-reality glasses, holographic displays and smoke tanks), and printers.

Computer system 700 can also include human accessible storage devices and their associated media such as optical media including CD/DVD ROM/RW 711 with CD/DVD or the like media 710, thumb-drive 712, removable hard drive or solid-state drive 713, legacy magnetic media such as tape and floppy disc, specialized ROM/ASIC/PLD based devices such as security dongles, and the like.

Those skilled in the art should also understand that term "computer-readable media" as used in connection with the presently disclosed subject matter does not encompass transmission media, carrier waves, or other transitory signals.

Computer system 700 can also include an interface 715 to one or more communication networks 714. Networks 714 can, for example, be wireless, wireline, optical. Networks 714 can further be local, wide-area, metropolitan, vehicular and industrial, real-time, delay-tolerant, and so on. Examples of networks 714 include local area networks such as Ethernet, wireless LANs, cellular networks to include GSM, 3G, 4G, 5G, LTE, and the like, TV wireline or wireless wide-area digital networks to include cable TV, satellite TV, and terrestrial broadcast TV, vehicular and industrial to include CANBus, and so forth. Certain networks 714 commonly require external network interface adapters (e.g., graphics adapter 725) that attached to certain general-purpose data ports or peripheral buses 716 (such as, for example, USB ports of the computer system 700; others are commonly integrated into the core of the computer system 700 by attachment to a system bus as described below (for example Ethernet interface into a PC computer system or cellular network interface into a smartphone computer system). Using any of these networks 714, computer system 700 can communicate with other entities. Such communication can be uni-directional, receive only (for example, broadcast TV), uni-directional send-only (for example, CANbus to certain CANbus devices), or bi-directional, for example to other computer systems using local or wide area digital networks. Certain protocols and protocol stacks can be used on each of those networks and network interfaces, as described above.

The aforementioned human interface devices, human-accessible storage devices, and network interfaces can be attached to a core 717 of the computer system 700.

The core 717 can include one or more Central Processing Units (CPU) 718, Graphics Processing Units (GPU) 719, specialized programmable processing units in the form of Field Programmable Gate Areas (FPGA) 720, hardware accelerators 721 for certain tasks, and so forth. These devices, along with Read-only memory (ROM) 723, Random-access memory (RAM) 724, internal mass storage such as internal non-user accessible hard drives, SSDs, and the like 722, may be connected through a system bus 726. In some computer systems, the system bus 726 can be accessible in the form of one or more physical plugs to enable extensions by additional CPUs, GPU, and the like. The peripheral devices can be attached either directly to the core's system bus 726, or through a peripheral bus 716. Architectures for a peripheral bus include PCI, USB, and the like.

The CPUs 718, GPUs 719, FPGAs 720, and accelerators 721 can execute certain instructions that, in combination, can make up the aforementioned computer code. That computer code can be stored in ROM 723 or RAM 724. Transitional data can be stored in RAM 724, whereas permanent data can be stored, for example, in the internal mass storage 722. Fast storage and retrieval to any of the memory devices can be enabled through the use of cache memory, which can be closely associated with one or more CPU 718, GPU 719, mass storage 722, ROM 723, RAM 724 and the like.

The computer-readable media can have computer code thereon for performing various computer-implemented operations. The media and computer code can be specially designed and constructed for the purposes of the present disclosure, or they can be of the kind well known and available to those having skill in the computer software arts.

As an example and not by way of limitation, the computer system having architecture 700, and specifically the core 717 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 717 that are of non-transitory nature, such as core-internal mass storage 722 or ROM 723. The software implementing various embodiments of the present disclosure can be stored in such devices and executed by core 717. A computer-readable medium can include one or more memory devices or chips, according to particular needs. The software can cause the core 717 and specifically the processors therein (including CPU, GPU, FPGA, and the like) to execute particular processes or particular parts of particular processes described herein, including defining data structures stored in RAM 724 and modifying such data structures according to the processes defined by the software. In addition or as an alternative, the computer system can provide functionality as a result of logic hardwired or otherwise embodied in a circuit (for example, accelerator 721), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of signaling audio mixing gain in a teleconference using a Session Description Protocol (SDP), the method comprising:
   receiving an input audio stream, from a 360-degree stream, including an audio mixing gain;
   signaling the audio mixing gain in an SDP offer;
      wherein the SDP offer comprises a first audio gain, an audio identifier associated with a first audio in the input audio stream, a second audio gain, and an overlay id associated with an overlay audio in the input audio stream; and
   based on a receiver accepting the SDP offer and based on a change in the audio mixing gain, signaling only an updated audio gain instead of signaling an entire media line.

2. The method of claim 1, wherein an Augmented Backus-Naur Form (ABNF) for the SDP is used to describe the audio mixing gain.

3. The method of claim 1, wherein a one-byte RTP header extension format is used for signaling the audio mixing gain.

4. The method of claim 1, wherein a two-byte RTP header extension format is used for signaling the audio mixing gain.

5. The method of claim 1, wherein a Uniform Resource Identifier (URI) in the SDP is used to declare a RTP header extension, and
   wherein the RTP header extension is only present in a first packet of the input audio stream.

6. The method of claim 1, further comprising updating the audio mixing gain,
   wherein the updating has a frequency less than a predetermined amount.

7. The method of claim 6, wherein a RTP header extension is repeated when the audio mixing gain is updated.

8. The method of claim 1, further comprising signaling an array of audio mixing gains from the input audio stream and the one or more overlay audio streams.

9. A system for signaling audio mixing gain in a teleconference using a Session Description Protocol (SDP), the system comprising:
- at least one memory storing instructions; and
- at least one processor configured to execute the instructions to:
  - receive an input audio stream, from a 360-degree stream, the input audio stream including an audio mixing gain;
  - signal the audio mixing gain in an SDP offer;
    - wherein the SDP offer comprises a first audio gain, an audio identifier associated with a first audio in the input audio stream, a second audio gain, and an overlay id associated with an overlay audio in the input audio stream; and
  - based on a receiver accepting the SDP offer and based on a change in the audio mixing gain, signal only an updated audio gain instead of signaling an entire media line.

10. The system of claim 9, wherein an Augmented Backus-Naur Form (ABNF) for the SDP is used to describe the audio mixing gain.

11. The system of claim 9, wherein a one-byte RTP header extension format is used for signaling the audio mixing gain or a two-byte RTP header extension format is used for signaling the audio mixing gain.

12. The system of claim 9, wherein a Uniform Resource Identifier (URI) in the SDP is used to declare a RTP header extension, and
wherein the RTP header extension is only present in a first packet of the input audio stream.

13. The system of claim 9, wherein the processor is further configured to execute the instructions to update the audio mixing gain,
wherein the updating has a frequency less than a predetermined amount.

14. The system of claim 9, wherein the processor is further configured to execute the instructions to signal an array of audio mixing gains from the input audio stream and one or more overlay audio streams.

15. A non-transitory computer readable medium for signaling audio mixing gain in a teleconference using a Session Description Protocol (SDP) storing instructions that, when executed by at least one processor, cause the at least one processor to:
- receive an input audio stream, from a 360-degree stream, the input audio stream including an audio mixing gain;
- signal the audio mixing gain in an SDP offer;
  - wherein the SDP offer comprises a first audio gain, an audio identifier associated with a first audio in the input audio stream, a second audio gain, and an overlay id associated with an overlay audio in the input audio stream; and
- based on a receiver accepting the SDP offer and based on a change in the audio mixing gain, signal only an updated audio gain instead of signaling an entire media line.

16. The non-transitory storage medium of claim 15, wherein an Augmented Backus-Naur Form (ABNF) for the SDP is used to describe the audio mixing gain.

17. The non-transitory storage medium of claim 15, wherein a one-byte RTP header extension format is used for signaling the audio mixing gain or a two-byte RTP header extension format is used for signaling the audio mixing gain.

18. The non-transitory storage medium of claim 15, wherein a Uniform Resource Identifier (URI) in the SDP is used to declare a RTP header extension, and
wherein the RTP header extension is only present in a first packet of the input audio stream.

19. The non-transitory storage medium of claim 15, wherein the instructions, when executed, cause the at least one processor to update the audio mixing gain,
wherein the updating has a frequency less than a predetermined amount.

20. The non-transitory storage medium of claim 15, wherein the instructions, when executed, cause the at least one processor to signal an array of audio mixing gains from the input audio stream and one or more overlay audio streams.

* * * * *